US012311653B2

(12) United States Patent
Barker

(10) Patent No.: US 12,311,653 B2
(45) Date of Patent: May 27, 2025

(54) ANILOX ROLL CLEANING BLANKET AND ASSEMBLY

(71) Applicant: PROSHIM SUPPLIES UK LTD, St. Helens (GB)

(72) Inventor: Matthew Barker, St. Helens (GB)

(73) Assignee: Proshim Supplies UK Limited, St. Helens (GB)

( * ) Notice: Subject to any disclaimer, the term of this patent is extended or adjusted under 35 U.S.C. 154(b) by 0 days.

(21) Appl. No.: 18/575,690

(22) PCT Filed: Jun. 28, 2022

(86) PCT No.: PCT/GB2022/051648
§ 371 (c)(1),
(2) Date: Dec. 29, 2023

(87) PCT Pub. No.: WO2023/275526
PCT Pub. Date: Jan. 5, 2023

(65) Prior Publication Data

US 2024/0336060 A1 Oct. 10, 2024

(30) Foreign Application Priority Data

Jul. 1, 2021 (GB) ..................................... 2109515

(51) Int. Cl.
*B41F 35/04* (2006.01)

(52) U.S. Cl.
CPC .......... *B41F 35/04* (2013.01); *B41P 2235/23* (2013.01); *B41P 2235/50* (2013.01)

(58) Field of Classification Search
None
See application file for complete search history.

(56) References Cited

U.S. PATENT DOCUMENTS 4,408,530 A 10/1983 Yano et al.
2003/0046785 A1* 3/2003 Shiroki .................. B41F 35/04 15/256.52

(Continued)

FOREIGN PATENT DOCUMENTS

EP 3112153 A1 1/2017
EP 3130469 A1 2/2017

(Continued)

OTHER PUBLICATIONS

English language abstract of JP 2011-025644 A to Maeda, publication date Feb. 10, 2011. (Year: 2011).*

(Continued)

*Primary Examiner* — Leslie J Evanisko
(74) *Attorney, Agent, or Firm* — Skaar Ulbrich Macari, P.A.

(57) ABSTRACT

A micro-fibre anilox cleaning blanket having a cleaning surface area defined by a first pair of parallel edges located on opposing ends of the blanket and a second pair of edges that run between said end edges along either side of the blanket is provided. A connection strip is provided on each end edge of the blanket. The connection strips are configured to form non-permanent slotted relationships with complementary connection elements on print cylinder attachment means such that the blanket can be mounted on a print cylinder. Also provided is a system that includes a plurality of cleaning blankets and a variety of different types of print cylinder attachment means that can be combined to achieve a wide range of cleaning blanket assemblies that correspond to different print cylinder designs.

14 Claims, 4 Drawing Sheets

(56) References Cited

U.S. PATENT DOCUMENTS

| | | | | |
|---|---|---|---|---|
| 2005/0061181 | A1 | 3/2005 | Burton | |
| 2017/0043571 | A1* | 2/2017 | Mietus | B41F 35/06 |
| 2019/0070847 | A1 | 3/2019 | Mounsey et al. | |

FOREIGN PATENT DOCUMENTS

| | | | | |
|---|---|---|---|---|
| GB | 2496609 | A | | 5/2013 |
| JP | 2005212187 | A | | 8/2005 |
| JP | 2011025644 | A | * | 2/2011 |

OTHER PUBLICATIONS

International Search Report rendered by the International Searching Authority for PCT/GB2022/051648, dated Oct. 4, 2022, 5 pages.

Written Opinion rendered by the International Searching Authority for PCT/GB2022/051648, dated Oct. 4, 2022, 7 pages.

* cited by examiner

ANILOX ROLL CLEANING BLANKET AND ASSEMBLY

PRIORITY

This application claims the priority of Great Britain patent application 2109515.3, filed Jul. 1, 2021, which is hereby incorporated herein by reference in its entirety.

FIELD

The present invention relates to the apparatus and methods for use in cleaning printing rollers, and in particular the cleaning of anilox rolls using micro-fibre cleaning blankets.

BACKGROUND

Anilox rolls are used in printing operations, such as flexographic printing, to provide measured quantities of ink to a flexographic printing plate so as to deliver a consistent printing effect.

Anilox rolls are hard cylinders that are typically formed from a steel or aluminium core that is provided with a coating of ceramic material. This ceramic coating is engraved with millions of very small depressions, which are commonly referred to as cells, or channels.

By way of the anilox cells/channels, controlled quantities of ink are transferred from an ink reservoir to the print surface of a printing plate, such as a flexographic printing plate. However, over time these cells/channels can become clogged with dry ink. This introduces inconsistencies into the quantities of levels being transferred to the printing plate by the anilox roll. This in turn can lead to a degradation of print image quality.

Various methods of cleaning anilox rolls are known. These cleaning methods range from off roll cleaning methods, in which the anilox roll is removed from the printing press and either cleaned manually or using specialised machinery, or in-situ cleaning methods, in which the anilox roll is retained on the printing press throughout the cleaning process.

One example of an in-situ cleaning approach is the use of micro-fibre cleaning plates or blankets. Using this approach the printing plate on an adjacent print cylinder is removed and replaced with a micro-fibre cleaning plate/blanket.

The printing press is then operated for a period of time so as to brush the micro-fibre cleaning plate/blanket over the anilox roll. In this way, and usually in the presence of cleaning detergents, the micro-fibres are forced into the anilox cells/channels, thereby removing any dry ink that might be present and returning the cells/channels to their original state.

Typically each micro-fibre cleaning plate/blanket is selected according to the printing press being cleaned and specifically to the dimensions of the print cylinder on which the cleaning plate/blanket is mounted during the cleaning process.

SUMMARY

The aim of the present invention is to provide a universal micro-fibre anilox cleaning blanket assembly that can be quickly and easily configured for use on a variety of different print cylinders.

Provided is a micro-fibre anilox cleaning blanket having a cleaning surface area defined by a first pair of parallel edges located on opposing ends of the blanket and a second pair of edges that run between said end edges along either side of the blanket; wherein each end edge is provided with a connection strip that is configured to form a non-permanent slotted relationship with a complementary connection element on a print cylinder attachment means such that the blanket can be mounted on a print cylinder.

By providing connection strips that are capable of forming non-permanent slotted relationships with print cylinder attachment means on both end edges of blanket, it is possible to vary the type of print cylinder attachment means used according to the size and design of the printing press on which the anilox roll is to be fitted. This enables the same cleaning blanket to be used on a range of different printing presses rather than requiring a separate cleaning blanket for each machine.

It is envisioned that in situations where the anilox roll to be cleaned is longer than a single cleaning blanket, two or more blankets could be mounted on a printing cylinder in alignment so as to define a larger, combined cleaning surface area.

In such situations it is considered preferable that, when laid flat, the cleaning blanket has at least one side edge that comprises an angularly offset portion that is oblique to the end edges of the blanket.

Providing a slanted edge on the cleaning blanket means that when the blanket is aligned with an adjacent blanket having a corresponding slanted edge any gap in the combined cleaning surface area that might exist between the blankets would be angularly offset from the cylinder's direction of rotation. By angularly offsetting the gap in this way it is possible to avoid the creation of a cleaning 'dead zone' between the blankets in which the anilox roll is not contacted by micro-fibres.

Preferably the angularly offset portion may be located in the middle of said side edge(s) with the rest of the side edge(s) being perpendicular to the end edges. Further preferably each side edge perpendicular portion is between 2-3 mm long.

It will be appreciated that providing non-slanted regions adjacent to each end edge of the blanket facilitates the attachment of a connection strip to each end edge. Generally speaking, in those cases where the side edge has an angularly offset portion, the majority of the side edge of the blanket is oblique to the end edges. Minimising the length of the perpendicular portions within the middle of the combined cleaning surface area minimises the creation of micro-fibre cleaning 'dead zones' in which the cells/channels of the anilox roll are neglected.

Preferably each angularly offset portion may be oriented at an angle of between 55 and 75° from one of the end edges of the blanket. Also, in situations where the angularly offset portion of a side edge is bordered by perpendicular portions, and/or the entire opposing side edge of the blanket is perpendicular to the end edges, the angularly offset portion is oriented at an angle of between 15 and 35° from said perpendicular portions.

Although other angles can be used, it is appreciated that this range strikes a balance between maintaining the structural integrity of the cleaning blanket and avoiding the creation of cleaning 'dead zones'.

Preferably each connections strip may define either a rib or a channel that runs along the length of the associated end edge.

Providing the connection strips as a rib or a channel that runs the length of each end edge not only provides additional structural strength to the end edges of the cleaning blanket but it also provides the maximum available contact surface for forming a non-permanent relationship with the print cylinder attachment means that facilitate the mounting of the cleaning blanket on a print cylinder. This helps to maintain the structural integrity of the cleaning blanket both before and after it has been mounted on a print cylinder.

Further provided is a micro-fibre anilox cleaning blanket assembly that in certain embodiments comprises: at least one micro-fibre anilox cleaning blanket; a plurality of print cylinder attachment means, each of which has a print cylinder mounting element and a complementary blanket connection element; and wherein each end edge connection strip engages at least one complementary blanket connection element so as to form a non-permanent slotted relationship between the blanket and said print cylinder attachment means thereby enabling the assembly to be mounted on a printed cylinder.

As noted above, because the attachment means used to mount the cleaning blanket on the printing cylinder are non-permanently slotted together with the cleaning blanket, the print technician has the ability to select the most appropriate attachment means for the particular design of printing press that is to be cleaned.

This is considered highly advantageous when compared to the alternative of providing a separate cleaning blanket for each design of printing press.

Also, when dealing with larger anilox rolls, one current approach is to clean the anilox roll in stages by fitting the cleaning blanket, running the press to clean a first portion of the anilox roll, then relocating the cleaning blanket and running the press a second time to clean the rest of the anilox roll.

Provided is an alternative approach for cleaning larger anilox rolls. For example, an assembly can include two or more cleaning blankets arranged adjacent one another such that their respective edges align to form a consolidated cleaning surface area.

Further preferably all of the connection strips along one end edge of the aligned blankets may engage with the blanket connection element of a single common print cylinder attachment means.

Alternatively, the connection strips on both end edges of the aligned blankets are engaged respectively with the blanket connection elements of common print cylinder attachment means.

It will be appreciated that the use of a single common print cylinder attachment means that engages the entire end edge of the aligned cleaning blankets unifies the separate blankets into a single consolidated structure that can be handled as one. This makes it more convenient for a print technician to mount and dismount the cleaning blanket assembly relative to the print cylinder.

Preferably the print cylinder attachment means are selected from a group that contains extension panels, tension bands and tension band clusters.

It is envisaged that the extension panels can be used to increase the overall length of the cleaning blanket assembly so that it can reach around print cylinders with large circumferences. Extension panels of various lengths could be employed depending on the shortfall between the length of the cleaning blanket and a print cylinder's circumference.

Tension bands and tension band clusters can be used to retain the cleaning blanket assembly on the print cylinder under tension so that the assembly hugs the cylinder even when it is rotating at speed.

Tension bands comprise a single blanket connection element and a single print cylinder mounting element separated by an elasticated member.

Tension band clusters, on the other hand, comprise a single blanket connection element with a plurality of print cylinder mounting elements connected to it at various points by way of elasticated members. It is appreciated that tension band clusters are particularly suitable for use in those assemblies that comprise multiple cleaning blankets.

Tension band clusters are quicker and easier to attach to the assembly but lack the adjustability that can be achieved by a plurality of separate tension bands that can be individually positioned on the assembly.

Preferably each blanket may comprise at least one side edge with an angularly offset portion and said portions are arranged in correspondence with one another so as to maintain a contiguous relationship between adjacent blankets thereby forming the consolidated cleaning surface area.

As detailed above, arranging adjacent cleaning blankets so that the border between them is angularly offset from the print cylinder's direction of rotation helps to avoid the creation of a cleaning 'dead zone' that runs around the entire circumference of cleaning blanket assembly and which would result in a line of anilox cells being left uncleaned by the cleaning blanket's micro-fibres.

Preferably the assembly may further comprise an underlay that supports the non-cleaning surface of the blanket and wherein the underlay either forms part of a print cylinder attachment means or is connectable thereto in addition to the connection strip of the blanket(s).

By providing an underlay below the non-cleaning surface of the cleaning blanket it is possible to increase the overall thickness of the cleaning blanket assembly to accommodate the variations in the inter-cylinder spacing found on different designs of printing presses. Preferably the underlay comprises a polyethylene foam.

Even further provided is a micro-fibre anilox cleaning system that in certain embodiments comprises: a plurality of micro-fibre anilox cleaning blankets; a plurality of print cylinder attachment means, each of which has a print cylinder mounting element and a complementary blanket connection element; wherein each end edge connection strip engages at least one complementary blanket connection element so as to form a non-permanent slotted relationship between the blanket and said print cylinder attachment means that enables the assembly to be mounted on a printed cylinder; and wherein said plurality of print cylinder attachment means comprises a range of print cylinder attachment means having a variety of print cylinder mounting elements configured to engage different designs of print cylinders.

The system herein provides a print technician with the ability to form a wide range of different cleaning blanket assembly configurations, thereby giving them the ability to clean a variety of printing press anilox rolls without the need to purchase and store a specific cleaning blanket for each design of printing press.

Preferably the cleaning surface areas of the cleaning blankets in the system may differ from one another. In this way the cleaning blankets can be used in different combinations to achieve a wide variety of consolidated cleaning surface areas, which once again affords the print technician with greater flexibility when cleaning the anilox rolls of a number of different printing presses.

Preferably the system may further comprise one or more underlays of different thickness that are selectable to adjust the overall thickness of the cleaning blanket assembly formed by the cleaning blankets and the print cylinder attachment means.

In this way the system not only allows the cleaning blanket assembly to accommodate a range of different print cylinder designs and sizes, it also allows the assembly to be used on printing presses with different inter-roll spacing.

DETAILED DESCRIPTION

Figure 1A:
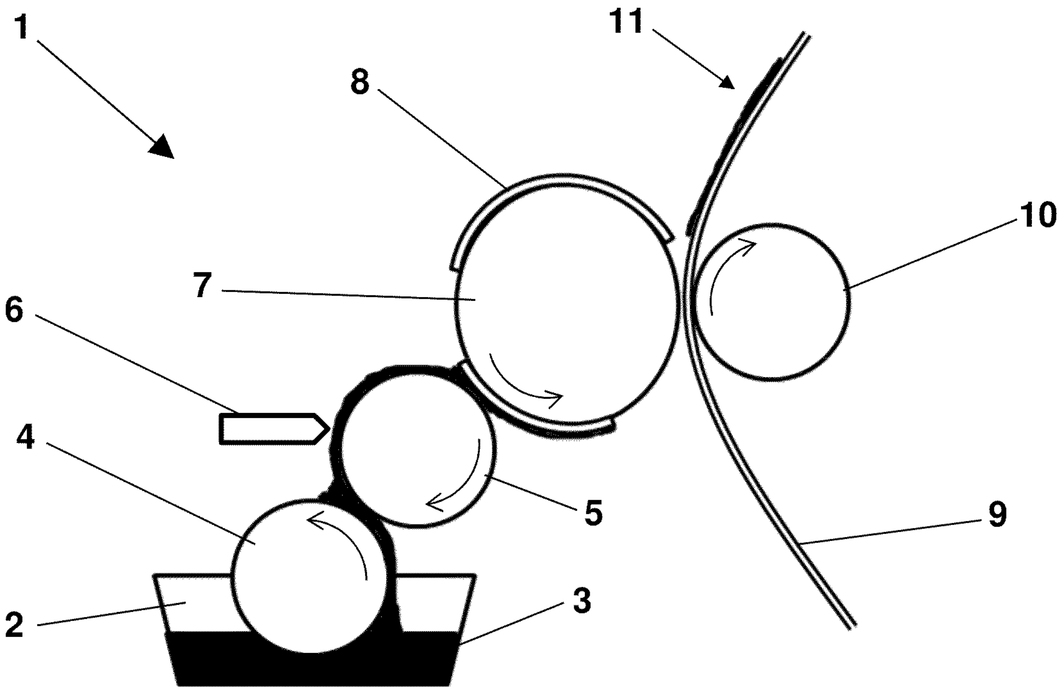
FIG. 1*a* shows a diagrammatic representation of a flexographic printing press in operation in accordance with embodiments of the present invention.
Figure 1B:
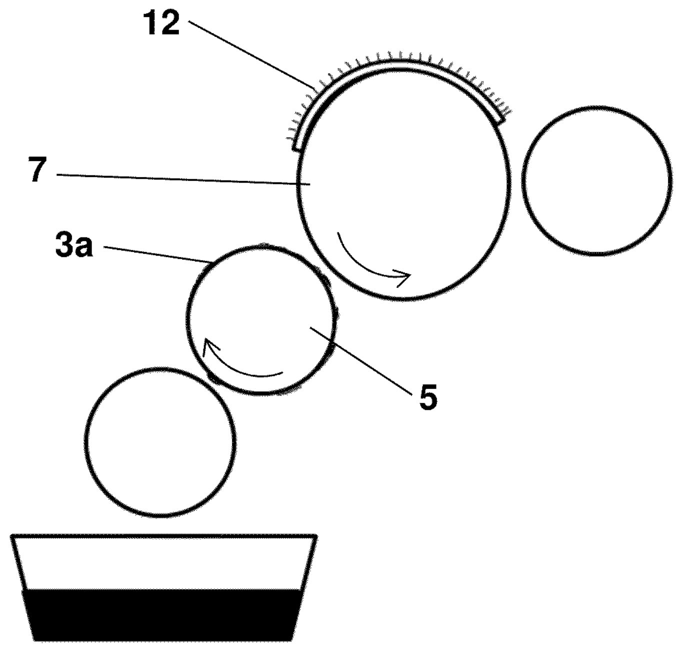
FIG. 1*b* shows a diagrammatic representation of the printing press of FIG. 1*a* during the cleaning of the anilox roll with a cleaning blanket in accordance with embodiments of the present invention.

Before describing the present invention in more detail a brief overview of the operation and cleaning of anilox rolls will be provided with reference to FIGS. 1*a* and 1*b*. FIG. 1*a* shows a diagrammatic representation of a typical flexographic printing press 1 in a printing operation. The press 1 transfers ink 3 from a reservoir 2 to a substrate 9 (e.g. paper, cardboard) by way of a series of rolls.

The process begins with the fountain roll 4 collecting ink 3 from the ink reservoir 2 as it rotates through it. The ink 3 is then transferred to an anilox roll 5 as the fountain roll 4 and the anilox roll 5 are brought into close contact with one another. The surface of the anilox roll 5 is provided with an array of cells or channels in which the ink 3 is retained. Excess ink is removed from the anilox roll 5 by the action of a doctor blade 6.

As the anilox roll 5 continues to rotate the retained ink is brought into contact with a printing plate 8 that is mounted on a print cylinder 7 (also referred to as a plate cylinder). The printing plate 8 picks up the ink as it rotates past the anilox roll 5.

In the final printing stage the ink on the printing plate 8 is transferred to a substrate material 9 (e.g. paper, cardboard, or other flexible packaging materials). An impression cylinder 10 supports the substrate 9 in order to ensure the transfer of ink from the print plate 8 to the substrate and in so doing complete the printing of an image 11.

Over time the cells/channels of the anilox roll 5 can become clogged with dried ink 3*a*. The build-up of dried ink 3*a* reduces the capacity of the anilox roll 5 to pick up ink for transfer to the printing plate. This in turn can lead to an inconsistent application of ink to the printing plate 8, which reduces the quality of the final print image 11 delivered to the substrate.

In order to avoid such reductions in image quality it is necessary to clean the anilox roll 5 from time to time. The anilox roll can be removed from the printing press in order to clean it. However, as this can be time consuming and involves a risk of the roll being damaged during the dismantling process, it is generally more preferable to clean the anilox roll in situ; that is, without removing it from the printing press.

FIG. 1*b* shows an example of one in situ approach that is currently employed to clean anilox rolls 5. During cleaning the ink reservoir 2 is disengaged to prevent further ink being transferred to the anilox roll 5. The printing plate 8 is also removed from the print cylinder 7 and replaced with a cleaning blanket 12. The cleaning blanket is provided with a cleaning surface made up of an array of projecting micro-fibres.

During the cleaning operation the printing press is operated so as to rotate at least the anilox roll 5 and the print cylinder 7. By this method, and usually with the addition of cleaning detergents, the cleaning blanket acts like a scrubbing brush and removes the dried ink 3*a* from the cells/channels of the anilox roll 5.

Once the dried ink 3*a* has been removed from the anilox roll 5 the cleaning blanket 12 can be removed from the print cylinder and the printing plate 8 can be mounted once again. The printing press 1, so cleaned, is then ready to carry out a new printing run.

Although the general operational principles of flexographic printing presses are the same, there are currently a wide variety of different printing presses in operation, each of which has its own unique combination of characteristics (e.g. cylinder size, plate mounting systems and inter-cylinder clearances). As a result there is necessarily a correspondingly wide range of cleaning blankets configured to run on such printing presses.

This can create issues when multiple printing presses are in operation at a particular site due to the need to purchase and store multiple cleaning blankets and also the possibility of incorrect cleaning blankets being mounted by mistake.

The present invention seeks to address these problems by providing a universal cleaning blanket system that can be quickly and easily mounted to a range of different printing presses.

Figure 2:
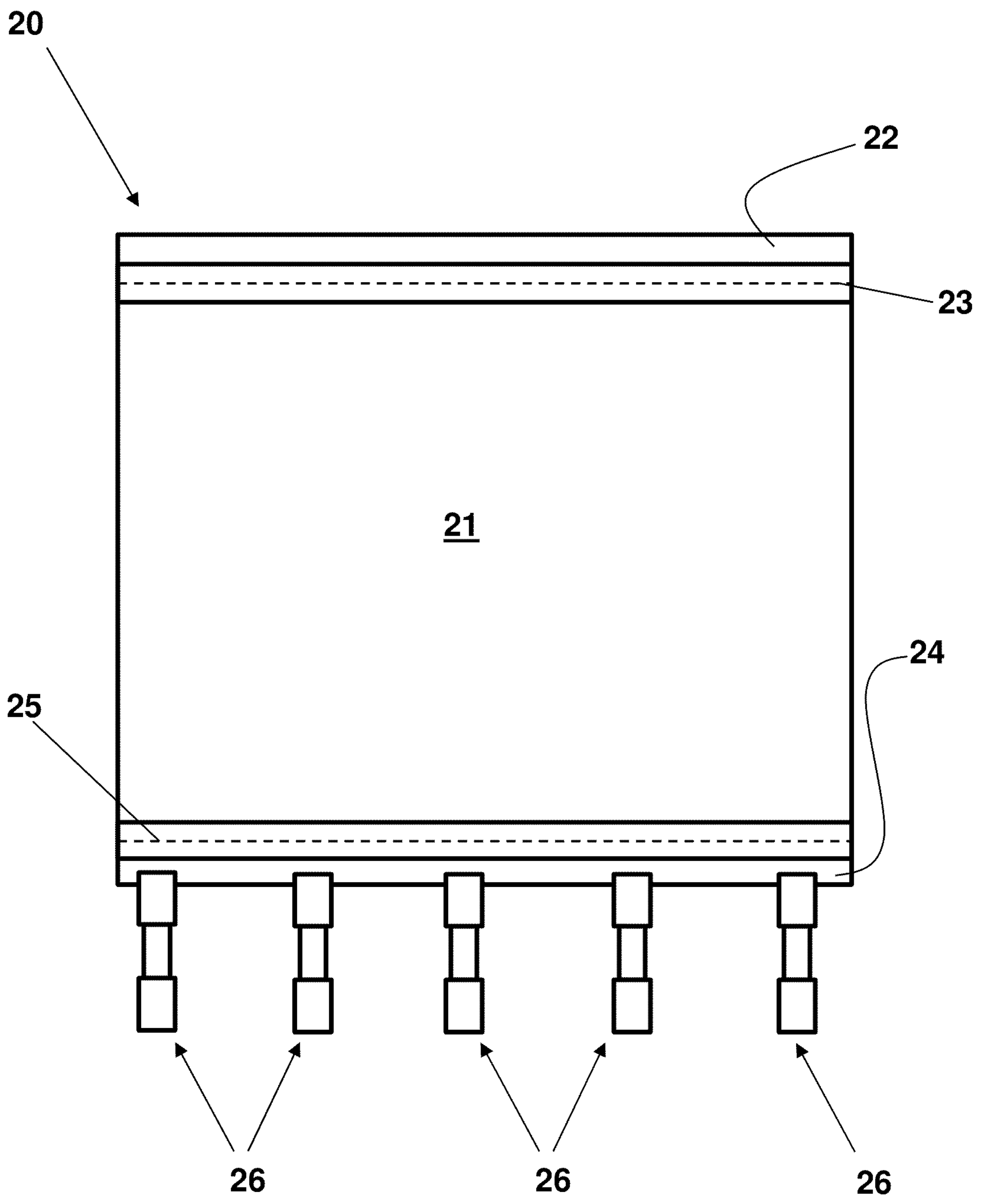
FIG. 2 shows a preferred embodiment of the cleaning blanket assembly in accordance with embodiments of the present invention.

A first preferred embodiment is shown in FIG. 2 in the form of a micro-fibre anilox cleaning blanket assembly 20. The assembly 20 comprises a micro-fibre cleaning blanket 21 which is typically formed as an array of upright plastic bristles (e.g. polyester, nylon) that project from a rubber support substrate or mat.

As will be appreciated by the skilled person, the length and diameter of the bristles, as well as the overall bristle array density, can vary from one cleaning blanket to the next but essentially the bristles are configured to get into the ink cells/channels of the anilox roll during the cleaning process. However, by way of example, the micro-fibres bristles employed in the preferred embodiments are about 6 mm long.

In order to facilitate the mounting of the cleaning blanket assembly 20 on a print cylinder the end edges of the blanket 21 (i.e. both the leading edge and trailing edge when the blanket is mounted on a print cylinder) are provided with connection strips 22 and 24. In the preferred embodiment shown, the connection strips are retained in position by stitching 23 and 25. However it is envisaged that an alternative preferred fixing method involves the use of a suitable adhesive.

The connection strips 22 and 24, which are preferably plastic extrusions (e.g. PVC) that have either a 'male' rib configuration or a 'female' channel configuration, are positioned on the end edges such that a complementary print cylinder attachment means can be non-permanently slotted onto them. In the example shown, the connection strips 22 and 24 have a 'male' rib configuration.

With reference to FIG. 2 it will be noted that print cylinder attachment means (i.e. tension bands 26) are only shown as being attached to one of the connection strips 24.

It will be understood by the skilled person that, in order for the cleaning blanket assembly 20 to be mounted on a print cylinder, connection strip 22 would also require print cylinder attachment means. However the print cylinder attachment means that would be used have been omitted from FIG. 2 in order to reveal the connection strip.

As noted above, the print cylinder attachment means provided on the connection strip 24 take the form of tension bands 26. It is envisaged that the tension bands 26 employed on the assembly 20 may be similar to those described in the applicant's earlier European Patent EP3112153.

In particular, each tension band 26 comprises a blanket connection element and a print cylinder mounting element joined by an elasticated strap. The cleaning blanket connection element is selected to be complementary to the connection strip (e.g. 24). As such the blanket connection element may take the form of either a 'female' channel or a 'male' rib.

However in the shown example, the tension bands are provided with a 'female' channel to accommodate the 'male' rib configuration of the connection strip 24. It will be appreciated that the complementary nature of the connection strip and the cleaning blanket connection element allows each tension band 26 to form a non-permanent slotted relationship with the cleaning blanket 21, which in turn facilitates the mounting of the cleaning blanket assembly 20 on a print cylinder 7 using the print cylinder mounting elements of the tension bands.

As the print cylinder attachment means (i.e. 26) are not permanently connected to the cleaning blanket 21 the print technician has the option to quickly replace them with print cylinder attachment means that have different configurations. This flexibility allows the print technician to attach tension bands, for example, with a different type of print cylinder mounting element so that the cleaning blanket can be mounted onto a different design of print cylinder.

The print technician also has the option to employ different lengths of extension panels (e.g. see panel 34 in FIG. 3) on the cleaning blanket assembly, which in turn enables the blanket assembly to be used on cylinders with different diameters.

Figure 3:
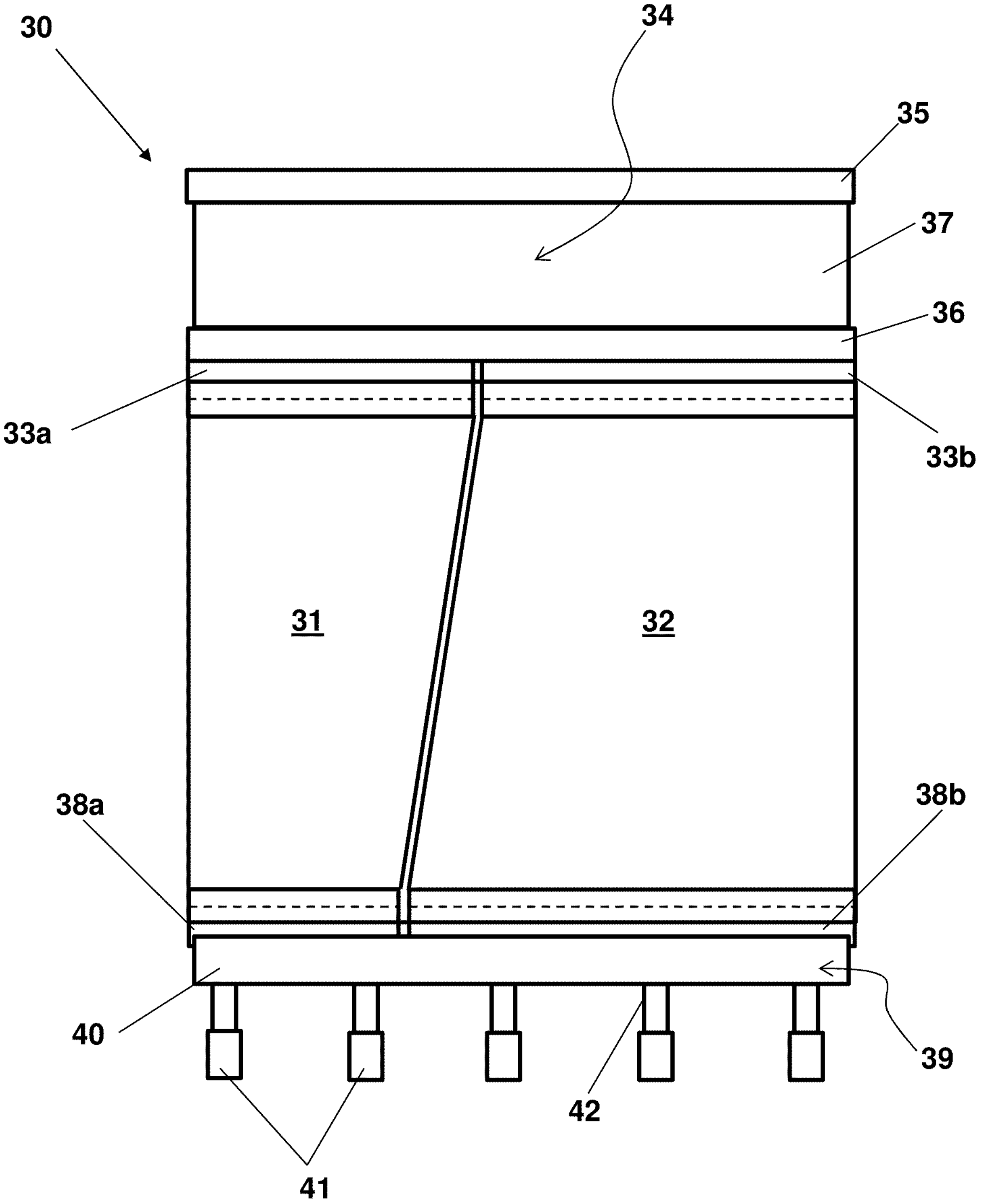
FIG. 3 shows a second preferred embodiment of the cleaning blanket assembly in accordance with embodiments of the present invention.

It is envisaged that even greater freedom of use is provided by the preferred embodiment shown in FIG. 3, which relates to a cleaning blanket assembly 30 that is formed from a pair of cleaning blankets 31, 32 rather than just a single micro-fibre blanket.

FIG. 3 shows a micro-fibre anilox cleaning blanket assembly 30 having a pair of micro-fibre cleaning blankets 31 and 32. Other than their shape, it is envisaged that the micro-fibre blankets have similar constructions.

As with the cleaning blanket 21 shown in FIG. 2, cleaning blankets 31 and 32 are provided with connection strips at each of their end edges (i.e. their leading and trailing edges). In particular, blanket 31 is provided with connection strips 33*a* and 38*a*, whereas blanket 32 is provided with connection strips 33*b* and 38*b*. Again, the connection strips are preferably stitched onto the blankets but alternative fixing methods may be employed without departing from the scope of the present invention.

As with the connection strips 22 and 24 shown in FIG. 2, the connection strips 33*a*, 33*b*, 38*a*, 38*b* shown in FIG. 3, which are preferably plastic extrusions (e.g. PVC) that has either a 'male' rib configuration or a 'female' channel configuration, are positioned on the end edges such that print cylinder attachment means can be non-permanently slotted onto the blanket assembly 30.

Each cleaning blanket 31, 32 constitutes a stand-alone separate component that can be handled separately. However, once the blankets have been aligned with one another they are secured together using the print cylinder attachment means, which in FIG. 3 take the form of extension panel 34 and tension band cluster 39.

The extension panel 34 comprises an elongate blanket connection element 36 and an elongate print cylinder mounting element 35 joined by a sheet of suitable plastic material 37 (e.g. polyesters such PET). The length of the sheet 37 can be selected to suit the length of cleaning blanket assembly that is needed for a particular design of print cylinder.

The tension band cluster 39 comprises an elongate blanket connection element 40 with a plurality of separate print cylinder mounting elements 41, each of which is joined to the elongate element by way of its own elasticated strap 42.

Specifically, with reference to FIG. 3, it will be appreciated that, once aligned, the connection strips 33*a* and 33*b* at the leading end edge of blankets 31, 32 are engaged by the blanket connection element 36 of the extension panel 34. At the trailing end edge of the blankets, the connection strips 38*a* and 38*b* are engaged by the blanket connection element 40 of the tension band cluster 39.

In this way the print cylinder attachment means (i.e. the extension panel 34 and the tension band cluster 39) serve a dual function of not only mounting the blankets onto a print cylinder but also retaining them in close alignment with one another so as to maintain a combined cleaning surface area.

By maintaining the blankets in close alignment with one another it is possible to create a cleaning blanket assembly that has a large cleaning surface area than might not otherwise be achievable due to the limitations associated with the manufacture of micro-fibre sheets.

It will be appreciated that in order for each pair of connections strips (i.e. 33*a*, 33*b* and 38*a*, 38*b*) to be received by a single common blanket connection element both connection strips need to be of the same type (i.e. 'male' rib or 'female' channel) so as to ensure a constant cross-section along the aligned connection strips.

It has been found that, even when multiple micro-fibre blankets are brought into alignment and retained in position by way of print cylinder attachment means, a gap can develop in the cleaning surface area of the cleaning blanket assembly 30. This gap has been exaggerated in FIG. 3 to highlight this issue.

Gaps in the cleaning surface area can lead to a cleaning 'dead zone' where there are insufficient micro-fibre bristles to effectively clean the anilox roll. This incomplete cleaning of the anilox roll can create interference on the final print image due to the cells in a specific region of the anilox roll not being able to hold the same amount of ink as the rest of the cleaned anilox roll.

In order to avoid the creation of such cleaning 'dead zones' the inventor found that the abutting side edges of neighbouring cleaning blankets could be provided with a sloped or slanted orientation. By adopting this arrangement it was possible to cause any gap to travel laterally across the anilox roll as cleaning process progressed. As a result, over time, every cell of the anilox roll would be brought into contact with the micro-fibre bristles and no cleaning 'dead zone' would remain.

Although, in theory, the entire length of a blanket's side edge might be slanted, in practise it was found that positioning the angularly offset portion of each side edge between end portions that remain perpendicular to the end edges was beneficial. This was because the perpendicular portions provided a constant straight end edge onto which the connection elements could be attached (e.g. by stitching).

Although it is envisioned that these perpendicular portions could extend for any length along the abutting side edges of the blankets, increasing the length of these portions also increases the possibility that a cleaning 'dead zone' may be created. Therefore, preferably each perpendicular portion runs for about 2-3 mm along the abutting side edge of each blanket.

The angularly offset portions of blanket side edges are preferably oriented at an angle (see 43 in FIG. 4) of between 55 and 75° from one of the end edges of the blanket. Also, in those embodiments where the side edge of the blanket has portions that are arranged perpendicular to the end edge of the blanket, it is envisioned that the angularly offset portions may be oriented at an angle of between 15 and 35° from such perpendicular portions.

Although not shown in FIGS. 1*a*-3, it is envisaged that the various embodiments of the present invention may further be provided with an underlay 44 below the micro-fibre cleaning blanket(s) such as shown in FIGS. 4(*a*) and 4(*b*). Preferably the underlay 44 comprises polyethylene foam. In this regard, underlays of different thicknesses could be employed to help further configure the cleaning blanket assembly to a particular design of printing press.

Preferably the underlays may also be configured to form non-slotted relationships with the cleaning blankets and/or the print cylinder attachment means on at least one of the end edges (such as the leading edge) of the blankets when they are mounted on a print cylinder.

Figure 4A:
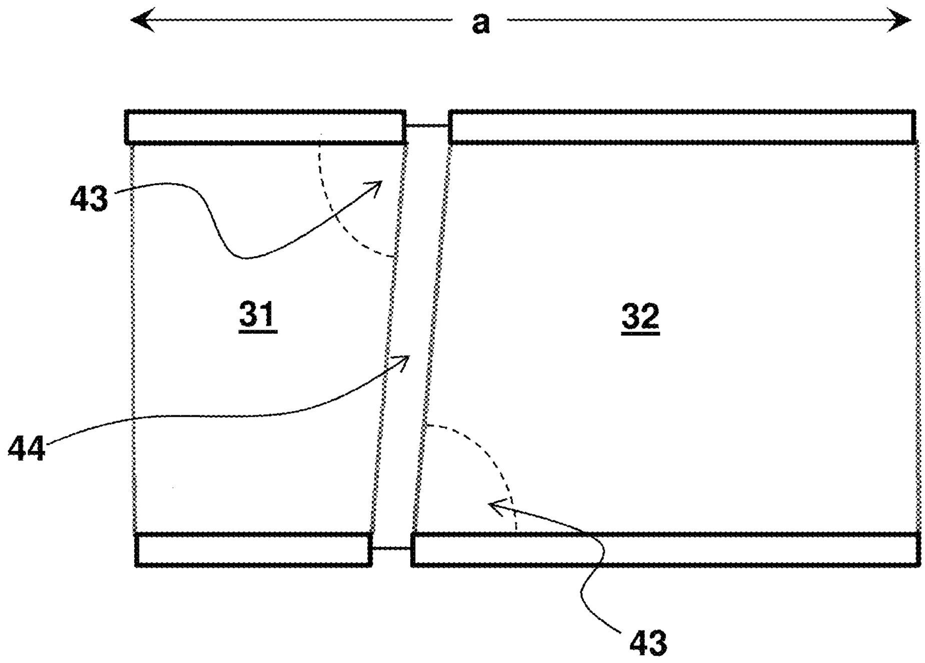
FIGS. 4*a* and 4*b* show the cleaning blanket assembly of FIG. 3 in two different size arrangements in accordance with embodiments of the present invention.
Figure 4B:
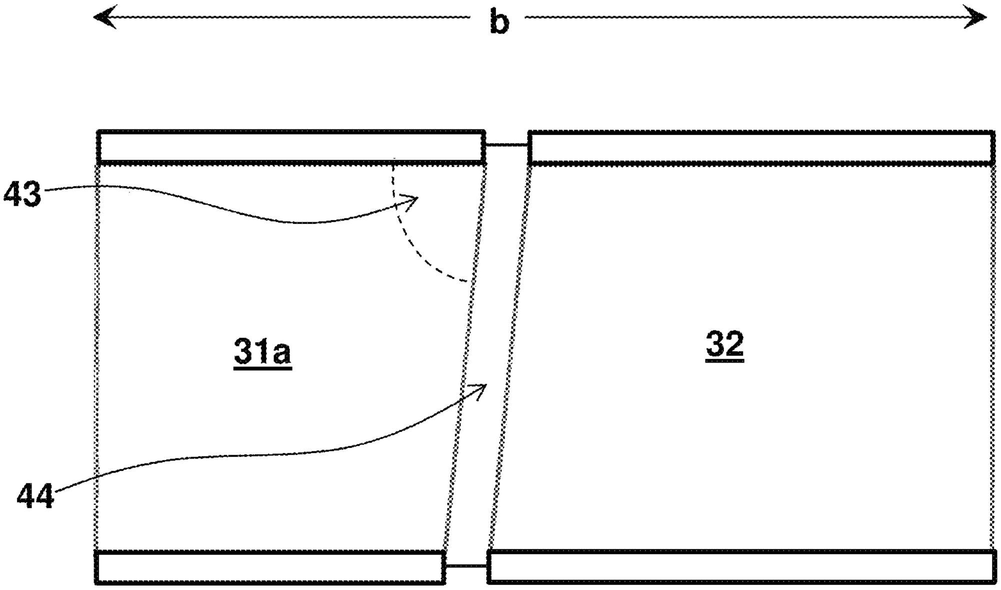

FIGS. 4*a* and 4*b* show how the micro-fibre cleaning blanket assembly 30 of the preferred embodiment shown in FIG. 3 can be reconfigured for use on a larger print cylinder by interchanging one of the cleaning blankets 31 with a second, larger cleaning blanket 31*a*.

FIG. 4*a* shows a simplified representation of the assembly 30 shown in FIG. 3. The total length of the assembly, as achieved by aligning cleaning blankets 31 and 32 adjacent to one another, is 'a'. In use, and as detailed above, the blankets would be held in alignment by the engagement of the complementary print cylinder attachment means to the end edges of the blankets.

In FIG. 4*b*, however, the total length of the assembly 30*a* has been increased to 'b' by replacing original blanket 31 with alternative blanket 31*a*, which is identical to the original blanket 31 other that with respect to its width.

As FIGS. 4*a* and 4*b* show the micro-fibre cleaning blankets 31, 31*a* and 32 slightly spaced apart it is possible to view the underlay 44 that, in use, lies between the assembly 30 and a print cylinder.

Although not shown, it will be appreciated that it would also be possible to achieve an assembly that is shorter in length than assembly 30 by replacing blanket 32 with blanket 31*a*.

It is envisaged that the cleaning blanket of the present invention makes it possible to provide a universal cleaning blanket system that, by way of selecting the appropriate combination of blankets and print cylinder attachment means (i.e. tension bands 26, extension panels 34, tension band clusters 40) a print technician can clean a wide variety of anilox rolls without the need to have a separate cleaning blanket for each printing press.

The invention claimed is:

1. A micro-fibre anilox cleaning blanket, comprising:

a blanket body having a cleaning surface area defined by a first pair of parallel edges located on opposing ends of the blanket body and a second pair of edges that run between the first pair of parallel edges along either side of the blanket body;

a connection strip provided to each of the first pair of parallel edges that is configured to form a non-permanent slotted relationship with a complementary connection element on a print cylinder attachment means such that the blanket can be mounted on a print cylinder; and wherein, when the blanket body is laid flat, at least one of the second pair of edges comprises an angularly offset portion that is oblique to the first pair of parallel edges of the blanket body.

2. The micro-fibre anilox cleaning blanket of claim 1, wherein the angularly offset portion is located in the middle of each of the second pair of edges with the rest of each of the second pair of edges being perpendicular to the first pair of parallel edges.

3. The micro-fibre anilox cleaning blanket of claim 2, wherein each perpendicular portion of each of the second pair of edges is between 2-3 mm long.

4. The micro-fibre anilox cleaning blanket of claim 1, wherein each angularly offset portion is oriented at an angle of between 55 and 75° from one of the first pair of parallel edges of the blanket body.

5. A micro-fibre anilox cleaning blanket assembly, comprising:

at least one micro-fibre anilox cleaning blanket according to claim 1; and a plurality of print cylinder attachment means, each of which includes a print cylinder mounting element and a complementary blanket connection element, wherein each connection strip engages at least one complementary blanket connection element so as to form a non-permanent slotted relationship between the blanket and at least one of the plurality of print cylinder attachment means, thereby mounting the assembly on a print cylinder.

6. The micro-fibre anilox cleaning blanket assembly of claim 5, wherein the assembly comprises two or more cleaning blankets arranged adjacent one another such that their respective edges align to form a consolidated cleaning surface area.

7. The micro-fibre anilox cleaning blanket assembly of claim 6, wherein all of the connection strips along one of the first pair of parallel edges of the aligned blankets engage with the blanket connection element of a single common one of the plurality of print cylinder attachment means.

8. The micro-fibre anilox cleaning blanket assembly of claim 6, wherein the connection strips on both of the first pair of parallel edges of the aligned blankets are engaged respectively with the blanket connection elements of a common one of the plurality of print cylinder attachment means.

9. The micro-fibre anilox cleaning blanket assembly of claim 6, wherein each blanket comprises at least one of the second pair of edges with an angularly offset portion and said portions are arranged in correspondence with one another so as to maintain a contiguous relationship between adjacent blankets thereby forming the consolidated cleaning surface area.

10. The micro-fibre anilox cleaning blanket assembly of claim 5, wherein the print cylinder attachment means comprise extension panels, tension bands and/or tension band clusters.

11. The micro-fibre anilox cleaning blanket assembly of claim 5, further comprising an underlay that supports the non-cleaning surface of the blanket body and wherein the underlay either forms part of a print cylinder attachment means or is connectable thereto.

12. A micro-fibre anilox cleaning system, comprising:

a plurality of micro-fibre anilox cleaning blankets according to claim 1; and a plurality of print cylinder attachment means, each of which includes a print cylinder mounting element and a complementary blanket connection element, wherein each connection strip engages at least one complementary blanket connection element so as to form a non-permanent slotted relationship between the blanket body and the print cylinder attachment means that enables the plurality of micro-fibre anilox cleaning blankets to be mounted on a printed cylinder to form a micro-fibre anilox cleaning blanket assembly; and wherein the plurality of print cylinder attachment means comprises a range of print cylinder attachment means having a variety of print cylinder mounting elements configured to engage a plurality of different configurations of print cylinders.

13. The micro-fibre anilox cleaning system of claim 12, wherein each of the cleaning surface areas of the plurality of micro-fibre anilox cleaning blankets in the system differ from one another.

14. The micro-fibre anilox cleaning system of claim 12, further comprising one or more underlays of different thickness that are selectable to adjust the overall thickness of the micro-fibre anilox cleaning blanket assembly formed by the plurality of micro-fibre anilox cleaning blankets and the plurality of print cylinder attachment means.

* * * * *